US008208694B2

(12) United States Patent
Jelonek et al.

(10) Patent No.: US 8,208,694 B2
(45) Date of Patent: Jun. 26, 2012

(54) METHOD AND SYSTEM FOR IMAGE AND VIDEO ANALYSIS, ENHANCEMENT AND DISPLAY FOR COMMUNICATION

(76) Inventors: Thomas Jelonek, Montreal (CA); Peter Whaite, Montreal (CA); René Saint-Pierre, Montreal (CA)

( * ) Notice: Subject to any disclaimer, the term of this patent is extended or adjusted under 35 U.S.C. 154(b) by 1021 days.

(21) Appl. No.: 11/759,067

(22) Filed: Jun. 6, 2007

(65) Prior Publication Data

US 2008/0002892 A1 Jan. 3, 2008

Related U.S. Application Data

(60) Provisional application No. 60/811,115, filed on Jun. 6, 2006.

(51) Int. Cl.
*G06K 9/00* (2006.01)

(52) U.S. Cl. ........ 382/118; 382/117; 382/209; 382/215; 382/217; 382/224; 382/228; 382/305

(58) Field of Classification Search .......... 382/117–118, 382/190, 305, 209, 215, 217, 224, 228
See application file for complete search history.

(56) References Cited

U.S. PATENT DOCUMENTS

| | | | | |
|---|---|---|---|---|
| 4,602,280 A * | 7/1986 | Maloomian | ............ | 382/100 |
| 6,000,407 A * | 12/1999 | Galazin | ............ | 132/200 |
| 6,035,055 A * | 3/2000 | Wang et al. | ............ | 382/118 |
| 6,070,167 A | 5/2000 | Qian | | |
| 6,071,171 A * | 6/2000 | George et al. | ............ | 446/391 |
| 6,091,836 A * | 7/2000 | Takano et al. | ............ | 382/118 |
| 6,597,368 B1 * | 7/2003 | Arai et al. | ............ | 345/646 |
| 6,643,385 B1 * | 11/2003 | Bravomalo | ............ | 382/100 |
| 7,010,144 B1 * | 3/2006 | Davis et al. | ............ | 382/100 |
| 7,027,622 B2 | 4/2006 | Pengwu | | |
| 7,209,577 B2 * | 4/2007 | McAlpine et al. | ............ | 382/118 |
| 7,246,110 B1 * | 7/2007 | Musgrove et al. | ............ | 1/1 |
| 7,436,987 B2 * | 10/2008 | Takano et al. | ............ | 382/117 |
| 7,474,759 B2 * | 1/2009 | Sternberg et al. | ............ | 382/100 |
| 7,519,200 B2 * | 4/2009 | Gokturk et al. | ............ | 382/118 |
| 7,564,994 B1 * | 7/2009 | Steinberg et al. | ............ | 382/118 |
| 7,634,103 B2 * | 12/2009 | Rubinstenn et al. | ............ | 382/100 |
| 2002/0181752 A1 * | 12/2002 | Wallo et al. | ............ | 382/130 |
| 2003/0007684 A1 * | 1/2003 | Kato et al. | ............ | 382/165 |
| 2003/0063794 A1 * | 4/2003 | Rubinstenn et al. | ............ | 382/154 |
| 2003/0065526 A1 * | 4/2003 | Giacchetti et al. | ............ | 705/1 |
| 2003/0191911 A1 * | 10/2003 | Kleinschnitz et al. | ............ | 711/154 |
| 2004/0008906 A1 * | 1/2004 | Webb | ............ | 382/306 |
| 2004/0153824 A1 * | 8/2004 | Devarajan et al. | ............ | 714/38 |
| 2004/0197013 A1 * | 10/2004 | Kamei | ............ | 382/118 |
| 2005/0018216 A1 * | 1/2005 | Barsness et al. | ............ | 358/1.6 |

(Continued)

OTHER PUBLICATIONS

Metadata creation—Images, Sarvas et al., ACM 1-58113-793, 2004, pp. 1-13.*

(Continued)

*Primary Examiner* — Jayesh A Patel

(74) *Attorney, Agent, or Firm* — Benoît & Côté

(57) ABSTRACT

There is described a system and a method for generating a metatag indicative of an attribute of a person represented in an image, the method comprising: performing a computer-based analysis of the image; identifying a feature related to the attribute of the person in the image using results from the computer-based analysis; generating the metatag based on the identified feature; and associating the metatag to the image, the metatag being thereby related to the attribute of the person.

22 Claims, 8 Drawing Sheets

U.S. PATENT DOCUMENTS

| | | | | |
|---|---|---|---|---|
| 2006/0018506 A1* | 1/2006 | Rodriguez et al. | ............ | 382/100 |
| 2006/0078172 A1* | 4/2006 | Zhang et al. | .................. | 382/118 |
| 2008/0298643 A1* | 12/2008 | Lawther et al. | ............... | 382/118 |
| 2009/0091798 A1* | 4/2009 | Lawther et al. | ............... | 358/3.28 |
| 2010/0002912 A1* | 1/2010 | Solinsky | ....................... | 382/117 |

OTHER PUBLICATIONS

A survey on metadata—resources, Moura et al., Baltzer science publishers BV, 1998 pp. 221-240.*

International Search Report, Patent Cooperation Treaty (PCT), application No. PCT/CA2007/001006.

A.J. Colmenarez and T.S. Huang "Face Detection with Information-Based Maximum Discrimination", Proc. IEEE Conf. Computer Vision and Pattern Recognition, pp. 782-787, 1997.

E. Osuna, R. Freund, and F. Girosi, "Training Suppor Vector Machines: an Application to Face Detection", Proc. IEEE Conf. Computer Vision and Pattern Recognition, pp. 130-136, 1997.

G. Yang and T. S. Huang. "Human Face Detection in a Complex Backround," Pattern Recognition, vol. 27 No. 1, pp. 53-63, 1994.

H. Schneiderman and T. Kanade "Probabilistic Modeling of Local Appearance and Spatial Relationships for Object Recognition", Proc. IEEE Conf. Computer Vision Pattern Recognition, pp. 45-51, 1998.

K. C. Yow and R. Cipolla, "Feature-Based Human Face Detection", CUED/F-INFENG/TR.249, Aug. 1996.

K.-K Sung and T. Poggio "Example-Based Learning for Wiew-Based Human Face Detection", IEEE Trans. Pattern Analysis and Machine Intelligence, vol. 20, No. 1, pp. 23-38, Jan. 1998.

M. Turk and A. Pentland, "Eigenfaces for Recognition," Vision and Modeling Group, The Media Laboratory, M.I.T., 1991.

P. Viola et al., "Detecting Pedestrians Using Patterns of Motion and Appearance," Computer Vision, 2003. Proceedings. Ninth IEEE International Conference on (2003), pp. 734-741 vol. 2.

R. Kjeldsen and J. Kender. "Finding Skin in Color Images," IEEE, pp. 312-317, 1996.

S. J. McKenna et al., "Modelling Facial Colour and Identity with Gaussian Mixtures," Dept. of Applied Computing,University of Dundee & Dept. of Computer Science, Queen Mary and Westfield College, 1998.

S.C. Dass and A.K. Jain, "Markov Face Models," in Proc. ICCV, 2001, pp. 680-687.

Y. Dal and Y. Nakano. "Face-Texture Model Based on SGLD and its Application in Face Detectionin a Color-Scene," Pattern Rcognition, vo. 29, pp. 1007-1017, 1996.

\* cited by examiner

METHOD AND SYSTEM FOR IMAGE AND VIDEO ANALYSIS, ENHANCEMENT AND DISPLAY FOR COMMUNICATION

CROSS-REFERENCE TO RELATED APPLICATIONS

This application claims priority of U.S. Provisional Patent Application No. 60/811,115 filed on Jun. 6, 2006, hereby incorporated by reference.

FIELD OF THE INVENTION

The invention relates to the field of digital image and video analysis and manipulation, and to the field of advertising and marketing.

BACKGROUND OF THE INVENTION

A digital image, or a sequence of images such as a video, can be obtained from a multitude of means; a digital camera, a camera phone, a scanned print of a photo, a digitally processed film negative, a video camera, images and video recorded on a user's computer memory, or on the Internet, from any online source or database, for example. Once available on a communication network, the images can be shared with others via a multitude of digital communication channels. For example, people share their photos through Internet on-line photo sharing websites, dating websites, social networking websites or by any other communication means, by using mobile phones to send the information to a website or directly to other mobile phones. Digital visual files stored on a physical memory device of a computer can also be shared.

The content of images and videos loaded on the network cannot however be known without a user viewing the images or video and proposing a list of features and corresponding attributes. As such, the content is not exploited and its value not realized. While the field of image/video based content analysis currently examines the content of images to assign metadata which refers to a given feature found within the images, this metadata is not descriptive and does not qualify the features as a viewer would do. Such qualification is related to the reactions of viewers in response to the content of the images and video. The prior art also does not provide the ability to qualify a user's emotional or social state, for example, using an image of the user, or related to the user.

SUMMARY OF THE INVENTION

It is therefore an aim of the present invention to provide a novel image analysis system and method that addresses issues associated with the prior art.

According to an embodiment of the invention, there is provided a method for generating a metatag indicative of an attribute of a person represented in an image, the method comprising: performing a computer-based analysis of the image; identifying a feature related to the attribute of the person in the image using results from the computer-based analysis; generating the metatag based on the identified feature; and associating the metatag to the image, the metatag being thereby related to the attribute of the person.

According to another embodiment of the invention, there is provided a system for generating a metatag indicative of an attribute of a person represented in an image, the system comprising: an image analysis device for performing a computer-based analysis of the image; a feature identifier for identifying the feature related to the attribute of the person in the image using results from the image analysis device; a metatag generator for generating the metatag based on the identified feature; and a metatag matcher for associating the metatag to the image, the metatag being thereby related to the attribute of the person.

According to another embodiment of the invention, there is provided a method for generating a metatag indicative of an attribute of a person represented in an image, the method comprising: sending the image to a processing device over a communication network, the processing device for: performing a computer-based analysis of the image; identifying a feature related to the attribute of the person in the image using results from the computer-based analysis; generating the metatag based on the identified feature; and associating the metatag to the image, the metatag being thereby related to the attribute of the person. And storing the metatag associated to the image in a database, the database being accessible over the communication network.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE INVENTION

Figure 1:
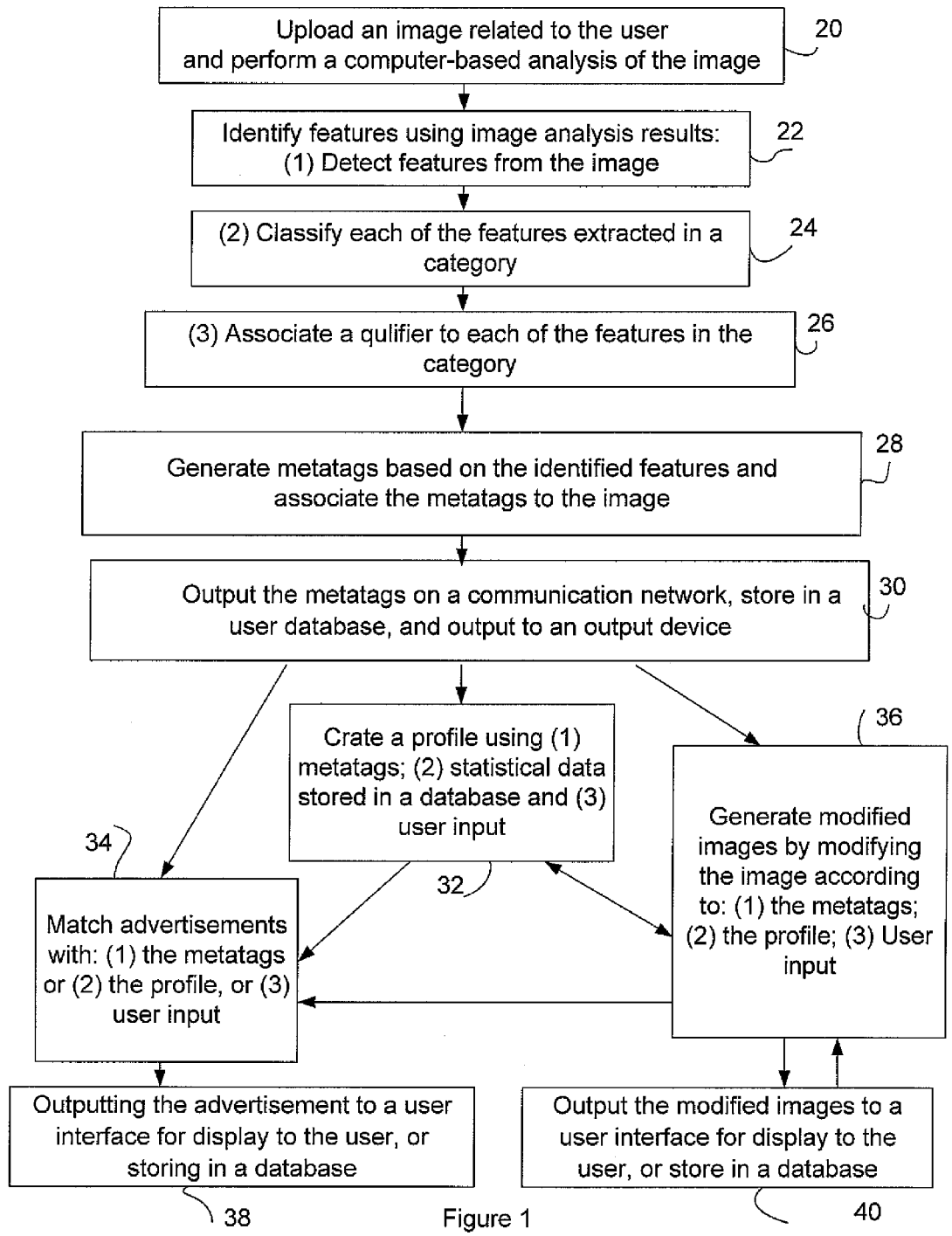
FIG. 1. is a block diagram showing the method according to an embodiment of the invention.

FIG. 1 illustrates the image analysis method, from the input of uploading of an image and performing a computer-based image analysis 20, using the results form the image analysis for identifying features in the image (steps 22 to 26), generating metatags based on the identified features in the image 28, to the output 30 of metatags related to an attribute of a person in the image. In an embodiment, the image comprises the face of the person in the image.

The metatags are outputted on a database, on a user-interface for display in the form of icons, to a profile builder, to an image/video modification module, or to a targeted advertisement matcher.

In step 20, the image is uploaded on the communication network, on a medium accessible through the communication network, or on a memory device of the user's computer. The image is then analyzed using a computer.

FIG. 1 also describes the optional steps of using the metatags to create a consumer profile 32 associated to the user viewing the image, to match targeted advertisements to the user 34, and to modify the image 36.

In steps 38 and 40, the matched targeted advertisements and the modified images of the user are then outputted on the communication network, and sent to a user-interface for display to a user. Alternatively, the modified images are sent to an address of the user, in a printed or email attachment format, provided the user entered such identification information.

In FIG. 1, the consumer profile created in step 32 is outputted to a database accessible over the communication network.

FIG. 1 also illustrates how the steps 32 to 36 optionally interact with one another. For example, information gathered from the user through the image modification step 36 is optionally used to match targeted advertisements targeted to the image, and to build the consumer profile. Similarly, the profile is optionally used to match advertisements to image or to the user viewing the image.

Still referring to FIG. 1, steps 22 to 26, in which features are identified using the results from the computer-based image analysis, according to a certain level of accuracy, are now described. In these steps, the content of an image or of a sequence of images forming a video, are used to generate metatags reflective of attributes of the user.

In step 22, features in the image are detected and located. Individual facial features are, for example: hair, eye, nose, ear, eyebrows, eye glasses, skin, cheekbone contour, mouth, lip, teeth, apparel, jewelry facial hair etc.

In step 24, these features are categorized. For example, all features which describe the hair are grouped together. Similarly, a category "mouth" has several features such as lips, teeth, lipstick, etc. Similarly, the category skin has features descriptive of a skin condition, color, etc. This step is optional.

In step 26, each categorized feature is qualified using objective visual appearance metrics determined by psychophysics, or any statistical information stored in a database. Each category has possible qualifiers. Qualifiers are associated to each feature, and according to their category. In the skin category, a tone, evenness, a color, or an aspect is a qualifier, for example. Similarly for a hair category, the eye category, and so on. Other qualifiers such as a shape or a type are also used. A qualifier is considered as an indication of a specific characteristic of a feature. This step is optional.

Various techniques are used to perform the above steps 22 to 26. Knowledge-based techniques use known information such as a structure of a feature to identify (locate, classify and qualify) a given feature. In such knowledge-based techniques, a geometry and a proportion of a human face is used, for example, to estimate a position of individual facial features, like the eyes, nose or mouth.

Other techniques such as using specific operators to detect specific features by for example their characteristics are also used. Results of many of these operators are grouped and classified in order to identify the feature with more accuracy. In one example, a series of edge and texture operators are used. Operators may thus be tuned to identify wrinkles, detect a color, determine a skin color and the presence of blemishes, a shape or any specific object or aspect to identify a feature.

Other appearance-based techniques are also used. These techniques define receptive field functions by prior training on a statistical sample of the desired feature, or by building a statistical model of the feature. Examples of these techniques are neural networks, wavelet classifiers, eigenfaces and hidden Markov models.

Template-based techniques are optionally used to identify features, so as to detect or located, classify and associate qualifiers to them. The predefined template models are fitted to an edge or any regional or area-based information about the feature. Such templates are designed to fit the specific feature and are optionally deformed to accurately localize the feature.

The above described techniques are used for any of the steps of detecting, classifying and qualifying features. They are optionally applied in a hierarchy to identify features according to increasingly higher orders of characteristics.

Starting with an image or video clip, appearance-based basis functions of a first set of detectors (for example, a Haar wavelet) are tuned or trained on faces or facial features. The result of these detectors, which output a probability of a match, are compared with results from knowledge based detectors, for example, (the known arrangement of facial features) to determine a best pre-set "candidate" for faces and facial features found in the image or video.

The detectors are optionally further segmented. For example, they are tuned to respond to faces/features grouped by demographic traits. This further segments the image since a competition between detectors occurs; one of these detectors resulting in outputs having the highest probability of a match to a preset "candidate" or feature characteristic.

Templates and detectors for identifying features such as an eye, a nose, an eyebrow, hair or a mouth, feature operators such as edge detectors to infer wrinkles, or skin color operators to determine skin condition or blemishes, are applied and the results compared to infer the presence and characteristics of features. These results are optionally used to automatically localize individual features in the image modification step 36. By further applying and comparing these operators in a hierarchical fashion, higher level inferences like degree of attractiveness or emotion or facial expression can be ascertained with probability, or inferred.

The above-described techniques used in steps 22 to 26 are known to those skilled in the art and are described in the following references.

Knowledge-based techniques are described in: G. Yang and T. S. Huang, "Human Face Detection in Complex Background, Pattern Recognition", vol. 27, no. 1, pp. 53-63, 1994.

Feature-based techniques are described in: K. C. Yow and R. Cipolla, "Feature-Based Human Face Detection", Image and Vision Computing, vol. 15, no. 9, pp. 713-735, 1997; Y. Dai and Y. Nakano, "Face-Texture Model Based on SGLD and Its Application in Face Detection in a Color Scene," Pattern Recognition, vol. 29, no. 6, pp. 1007-1017, 1996; J. Yang and A. Waibel, "A Real-Time Face Tracker," Proc. Third Workshop Applications of Computer Vision, pp. 142-147, 1996; S. McKenna, S. Gong, and Y. Raja, "Modelling Facial Colour and Identity with Gaussian Mixtures," Pattern Recognition, vol. 31, no. 12, pp. 1883-1892, 1998; R. Kjeldsen and J. Kender, "Finding Skin in Color Images," Proc. Second Int'l Conf. Automatic Face and Gesture Recognition, pp. 312-317, 1996.

Template-based techniques are described in: I. Craw, D. Tock, and A. Bennett, "Finding Face Features," Proc. Second European Conf. Computer Vision, pp. 92-96, 1992; A. Lanitis, C. J. Taylor, and T. F. Cootes, "An Automatic Face Identification System Using Flexible Appearance Models," Image and Vision Computing, vol. 13, no. 5, pp. 393-401, 1995.

Appearance-based techniques are described in: M. Turk and A. Pentland, "Eigenfaces for Recognition," J. Cognitive Neuroscience, vol. 3, no. 1, pp. 71-86, 1991; K.-K. Sung and T. Poggio, "Example-Based Learning for View-Based Human Face Detection," IEEE Trans. Pattern Analysis and Machine Intelligence, vol. 20, no. 1, pp. 39-51, January 1998; H. Rowley, S. Baluja, and T. Kanade, "Neural Network-Based Face Detection," IEEE Trans, Pattern Analysis and Machine Intelligence, vol. 20, no. 1, pp. 23-38, January 1998; E. Osuna, R. Freund, and F. Girosi, "Training Support Vector Machines: An Application to Face Detection," Proc. IEEE Conf. Computer Vision and Pattern Recognition, pp. 130-136, 1997; H. Schneiderman and T. Kanade, "Probabilistic Modeling of Local Appearance and Spatial Relationships for Object Recognition," Proc. IEEE Conf. Computer Vision and Pattern Recognition, pp. 45-51, 1998; A. Rajagopalan, K. Kumar, J. Karlekar, R. Manivasakan, M. Patil, U. Desai, P. Poonacha, and S. Chaudhuri, "Finding Faces in Photographs," Proc. Sixth IEEE Int'l Conf. Computer Vision, pp. 640-645, 1998; A. J. Colmenarez and T. S. Huang, "Face Detection with Information-Based Maximum Discrimination," Proc. IEEE Conf. Computer Vision and Pattern Recognition, pp. 782-787, 1997; Paul Viola, Michael J. Jones, Robust Real-time Object Detection, Cambridge Research Laboratory Technology Reports Series, CRL 2001/01, February, 2001; and P. Viola. M. Jones and D. Snow. Markov Face Models. In Proceedings of the Ninth IEEE Conference on Computer Vision and Pattern Recognition, volume 2, pages 734-741, 2003.

In step 28, the feature identification steps 24 to 26 are used to generate metatags and thus associate the metatags to the image. Resulting metatags are, for example, a hair style (curly, straight, short or any other characteristic), a hair quality, baldness, a hair color (brown, blond, grey, or any other characteristic) can be qualified in the hair category. Similarly, an eye shape and color, an eyebrow shape and color, a skin color and texture, a cheekbone contour shape, the texture of wrinkles, a skin condition such as acne, a mouth shape, a lip color, a lipstick color, a teeth shape and condition, smile characteristics, a make-up characteristic, an eye shadow type and color, a jewelry type, a clothing characteristic, an apparel type, a hat shape, a level of tan, or any other tag describing a characteristic of a given person in the image. Note that the above list is not exhaustive and other metatags can be associated to an image.

A list of possible metatags are optionally stored in a database, according to feature categories and qualifier associations. The metatags generated take into consideration physiological and current statistical information. In some cases, a metatag indicates a facial beauty, a probable emotion, an age group, an ethnicity, or any other higher level characteristic of the person in the image which corresponds to lower level feature identifications. For example, if the skin color is white, wrinkles are detected, and the facial features are positioned to correspond to a female, then the metatags may be: woman, age 40 to 60, Caucasian, or any other characteristic associated to such a list of features.

The method described by steps 20 to 28 uses content of the image to generate metatags indicative of attributes of the person in the image. The metatags are then associated to the image and used for many purposes, such as advertising, user profiling image/video linking and researching. Once the metatags are stored, they can be used to form interactive elements with which a user may interact. For example, the user sees a metatag related to a lip when probing a lip of a person on an image being displayed. At the same time, advertisement related to the metatag of the probed feature is displayed to the user.

Figure 2:
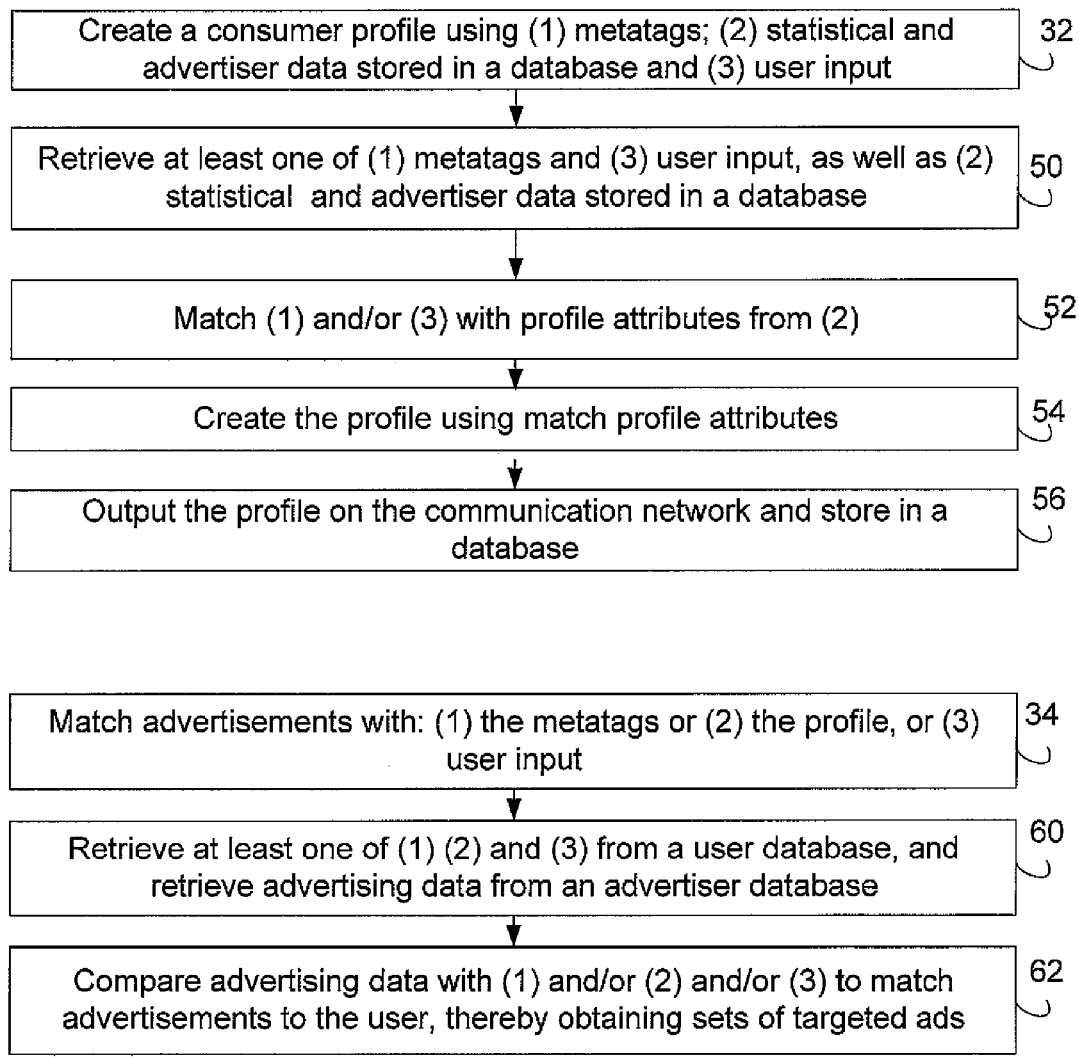
FIG. 2 is a block diagram showing the substeps in the steps of creating a consumer profile and matching advertisements as illustrated in FIG. 1.

Now referring to FIG. 2, the step of creating a consumer profile 32 and the step of matching targeted advertisements 34 to the image and the user viewing the image are now described in more detail and in accordance with a specific implementation.

To create a consumer profile, in step 50, the (1) metatags and the (3) user-entered modification preferences provided in an image modification step 36 are retrieved from a user database. The user-entered modification preferences are optional. Also retrieved is (2) statistical and advertiser data such as profile indicators stored in a statistical or advertiser database.

In step 52, at least one of (1) or (3) are matched with pre-set profile indicators from (2).

In step 54, the profile is created using the matched profile indicators.

In step 56, the profile is outputted on the communication network or stored in a user database.

The profile indicators optionally identifies from the image, a face, facial features and outline, optionally provides an age group, an ethnicity, a gender, an emotional expression, a lifestyle, an affluence, social values, geo-location, personality and a social group. The facial characteristics are in some cases used to define the intentionality or behavioral attitude, or other personal characteristics of a person represented in the image. In this case, psychophysics of facial appearance are used. Psychophysics are also used to determine beauty, attractiveness, personality traits like confidence or power, and emotions. The style and fashion of the subject in the image may also be inferred.

Still referring to FIG. 2, the step of matching advertisements 34 with metatags, consumer profiles and any user-entered image modification preferences is achieved by first retrieving (step 60) from a user database, at least one of (1) the metatags and (2) the consumer profile, with optional (3) user-entered information such as image modifications preferences. Advertising data is also retrieved from an advertiser database.

Correspondences are then generated between the metatags, the created consumer profile and any optional user-entered information, with advertising statistics, in order to rank an array of contextual advertisements by criteria.

Hence, in step 62, any one or a combination of (1), (2) and (3) are compared with advertising data to generate correspondences with advertisements. In this way, any of (1), (2) and (3) are matched with targeted advertisements for the user.

Referring to FIGS. 1 and 2, the matched advertisements are then displayed to the user in step 38. Optionally, a user's response to the ads, if any, is be stored in both user and advertiser databases.

Figure 3:
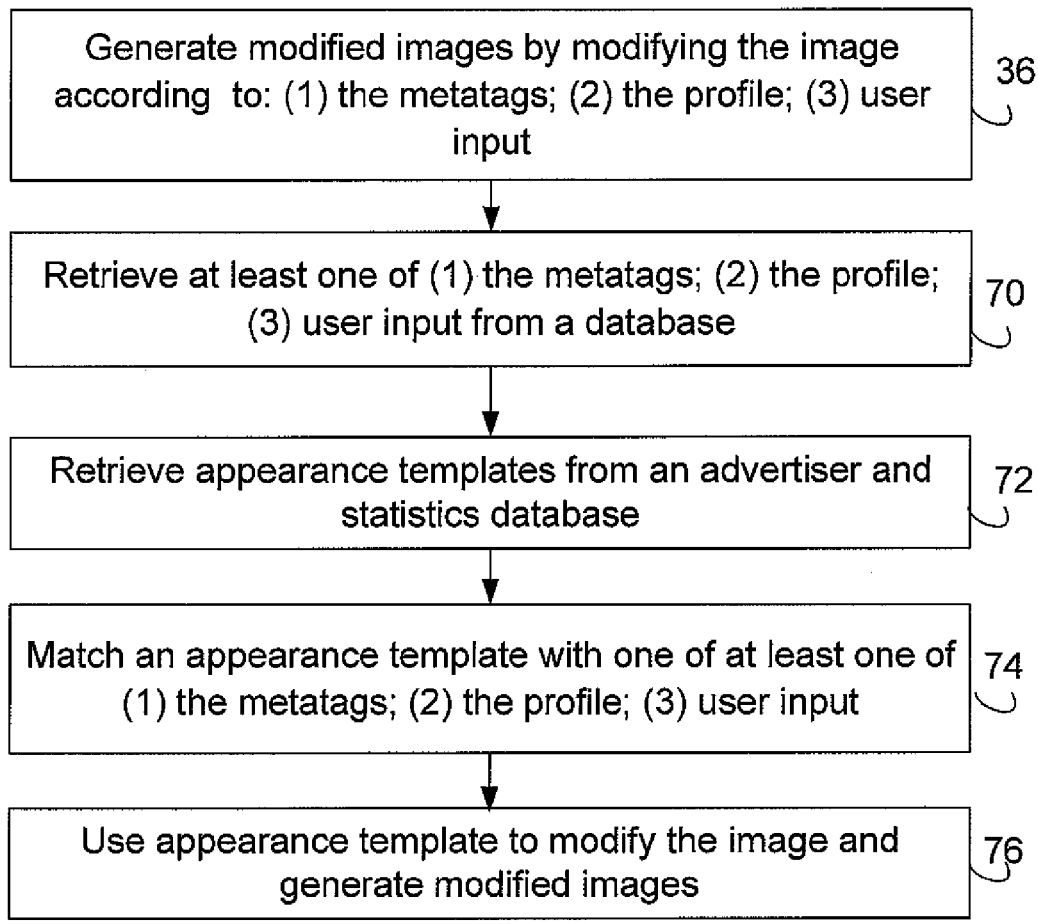
FIG. 3 is a block diagram showing the substeps in the step of modifying the images as illustrated in FIG. 1.

Now referring to FIG. 3, the step of modifying the image related to the user 36 is now described in more detail in accordance with an implementation.

In step 70, any of (1) the metatags generated by the image analysis, (2) the consumer profile created and (3) any optional user-entered information such as image modification preferences, are retrieved from a user database.

In step 72, appearance templates are retrieved from an advertiser and statistics database.

In step 74, the appearance templates are matched with any one of (1), (2) and (3).

In step 76, the appearance templates matched or chosen by the user are used to modify the image and thus generate correspondingly modified images. The modified images may be stored in a user database, for example, or in any other memory device.

The modified images are then sent to a user display or user interface in step 40 (see FIG. 1). The images are displayed in a ranked list of modified images, according to user preferences and advertiser information retrieved. These images are displayed on a computer screen, on an Internet site or on a mobile phone for example.

If the user dislikes the modifications and wishes to change modification parameters, the user may enter such information into the system, thereby reiterating the image modification step 36 until the user is satisfied with the outputted modified images. For example, the user can select preferred images or change his/her preferences and appearance templates in order to change the modified image ranking. The user selections, preferences and displayed modified images, as well as the history of all these elements are stored in the user database.

The image modification step 36, and sub-steps 70-76 use fashion trends or styles, for example, to enhance images. Processing the image to ensure that it "captures the moment" conveying meaning to the viewer, the characteristics of that moment being user defined, are also be performed using this method.

Several image modification techniques known by those skilled in the art are described in the following references: George Wolberg, Image morphing: a survey, The Visual Computer, 1998, pp. 360-372; Thaddeus Beier, Shawn Neely. Feature-Based Image Metamorphosis, SIGGRAPH 1992; Frederic Pighin, Jamie Hecker, Dani Lischinski, Richard Szeliski, and David Salesin. Proceedings of SIGGRAPH 98, in Computer Graphics Proceedings, Annual Conference Series, 1998; and "Geometry-Driven Photorealistic Facial Expression Synthesis," Q. Zhang, Z. Liu, B. Guo, D. Terzopoulos, H.-Y. Shum, IEEE Transactions on Visualization and Computer Graphics, 12(1), January/February, 2006, 48-60.

A ranking of the modified images is performed, for example, by beauty, attributes, emotions, attractiveness, combinations of different emotions and various character traits such as: sexiness, friendliness, seriousness and perception of power, business, success strength, or any other given criteria. A synthesis of many images together is also optionally performed to achieve an enhanced composite or portrait.

The image modification also takes into consideration different personality traits. Hence, psychophysics is also used in this step to determine the parameters and metrics of modification. The various metrics are optionally selected according to user selections. These selections are optionally chosen by the user such that they elicit a specific response from a viewer of the image. Inversely, these metrics can also be selected to reflect variations of fashion in time, and variations of human receptivity in time.

It is understood that the image modification method is also used by the user to enhance, for example, saturation, image colors, to remap colors, enhance shadows, change the lighting or shadows, colors, or any attribute of the user such as clothing and apparel, hair, makeup color. Alternatively, pre-set "looks" are selectable by the user, the preset "looks" reflecting current fashion trends. Hence, the images are modified to convey a given "look" such as a recognizable style or artistic quality.

The image modification method is optionally performed by using avatars as appearance templates. The avatars are submitted or created by the user, or any other artist.

All of the user preferences, information and selections which are optionally part of the step of image modification 36 result in indicators to be employed in the matching of targeted advertisements of step 34.

Figure 4:
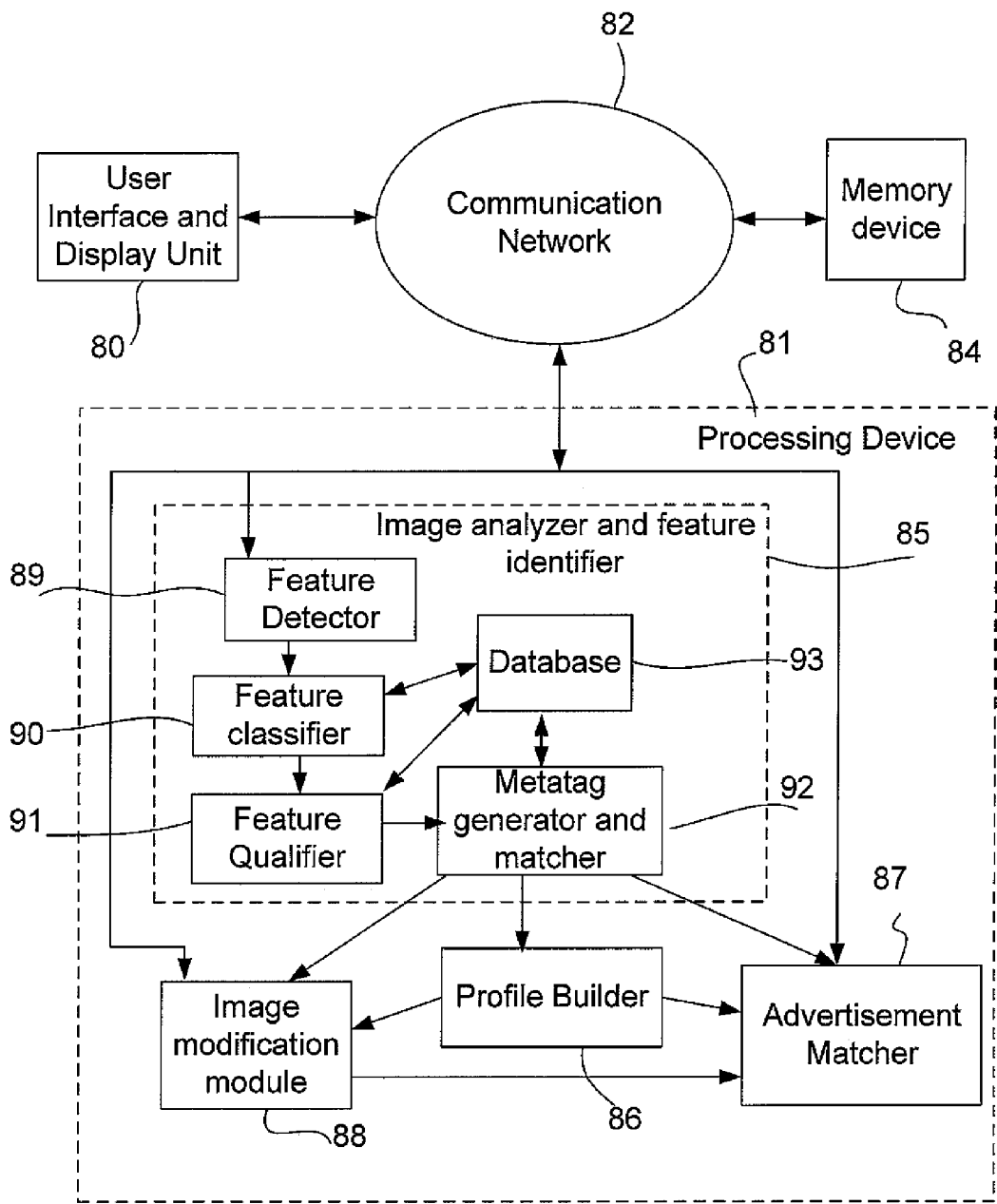
FIG. 4 is a schematic illustrating the system according to an embodiment of the invention.

Now referring to FIG. 4, the system illustrated is used in some cases to implement the method as described in FIGS. 1 to 3.

The system has a user interface 80 connected to a network 82. A processing device 83 and a memory device 84 for storing user data, images, advertising and statistics data are also accessible through the network 82. The memory device 84 can be formed of several distinct memory devices storing specific databases.

The processing device 81 has an image analysis module 85 for analyzing images uploaded on the network 82 and viewed by a user. The processing device 81 optionally has a profile builder 86, a targeted advertisement matcher 87, and an image modification module 88.

The image analyzer and feature identifier 85 has an image analysis device and a feature identifier. These devices may be implemented as separate components. Image analyzer and feature identifier 85 have a feature detector 89, a feature classifier 90, a feature qualifier 91 and a metatag matcher 92. These three devices (89-92) are regrouped within the feature identifier unit. Note that the illustrated system is one embodiment. Other embodiments wherein all the components are implanted separately is also contemplated by the present description.

The processing device 81 optionally has an internal memory device 93 embodied as a single or several memory devices, accessible by all of the components of the processing device 81.

Alternatively, the processing device 81 has several distinct processing devices, each implementing a component of the processing device 81 as illustrated in FIG. 4. In some cases, the processing device 81 is a user's processing device. In other cases, for example, only some components of the device 81, such as the image modification module 88, are implemented by a processing device of the user's computer. In such embodiments, all the components of the system communicate with each other via the network 82.

Still referring to FIG. 4, the feature detector 89 is implemented to detect, locate, and optionally extract features. A tuned array of feature detectors is employed to locate features of interest.

The feature detector 89, the feature classifier 90 and the feature qualifier 91 use known feature information or structure to identify, locate, classify and qualify a feature. For example, known geometry and proportions of faces are used to estimate positions of individual facial features, like the eyes, nose or mouth, ears, hair, etc. Similarly, parts of the person's body and apparel are identified, located and classified accordingly. Specific feature-based operators form part of the feature detector 89, the feature classifier 90 and the feature qualifier 91, for specifically identifying a given feature in the image 100.

The feature detector 89, the feature classifier 90 and the feature qualifier 91 also have template operators to match with a feature having similar characteristics, such as a known color, shape, apparel type or brand. Such operators are used, for example, to qualify the features according to preset qualifiers such as tone and color. A quantifiable analysis of jewelry and apparel is also performed.

Appearance-based operators are also present to define receptive field functions. In such as case, a feature is identified by training the operators on a statistical sample of the desired feature, or by building a statistical model of the feature. Examples of appearance-based qualifying devices are neural networks, wavelet classifiers, eigenfaces and hidden Markov models.

The results of the various components of the image analyzer and feature identifier 85 are optionally matched and compared to add probabilistic support to each other. It is possible to add more layers of classifiers, these being trained on semantically higher order features.

Figure 5:
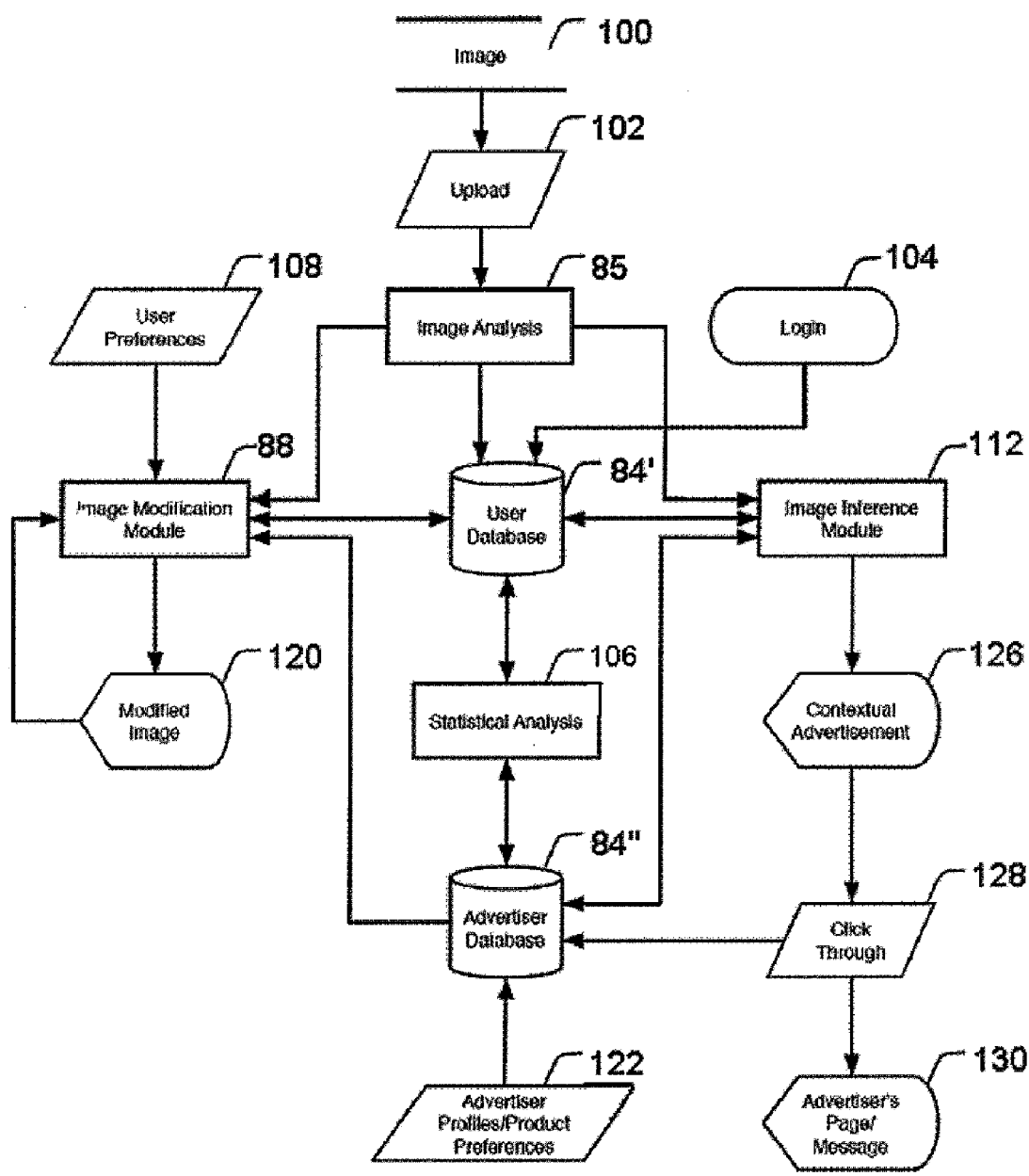
FIG. 5 illustrates the system of FIG. 4 according to a specific implementation.
Figure 6:
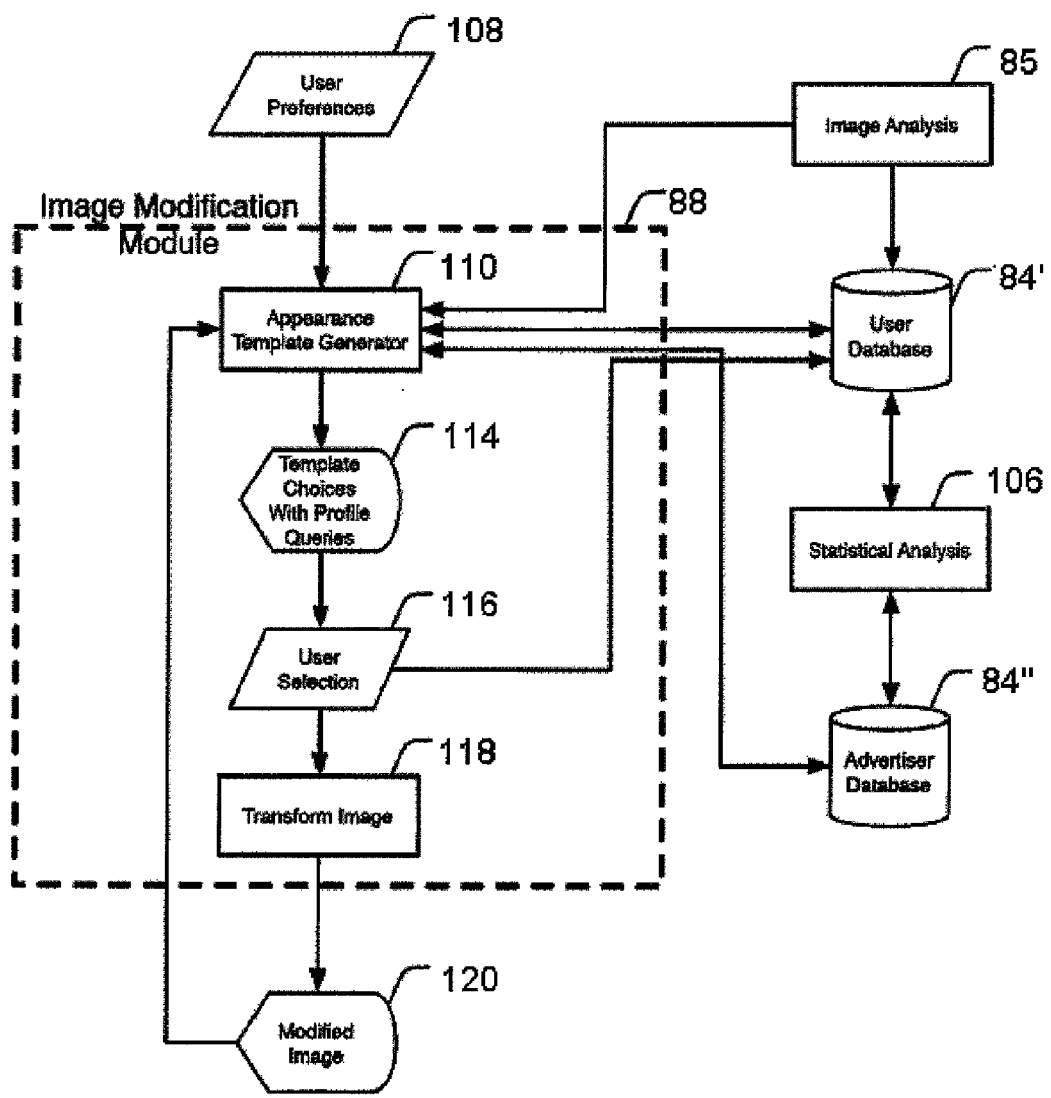
FIG. 6 illustrates the Image Modification Module of FIG. 5 along with its interaction with components of the system.
Figure 7:
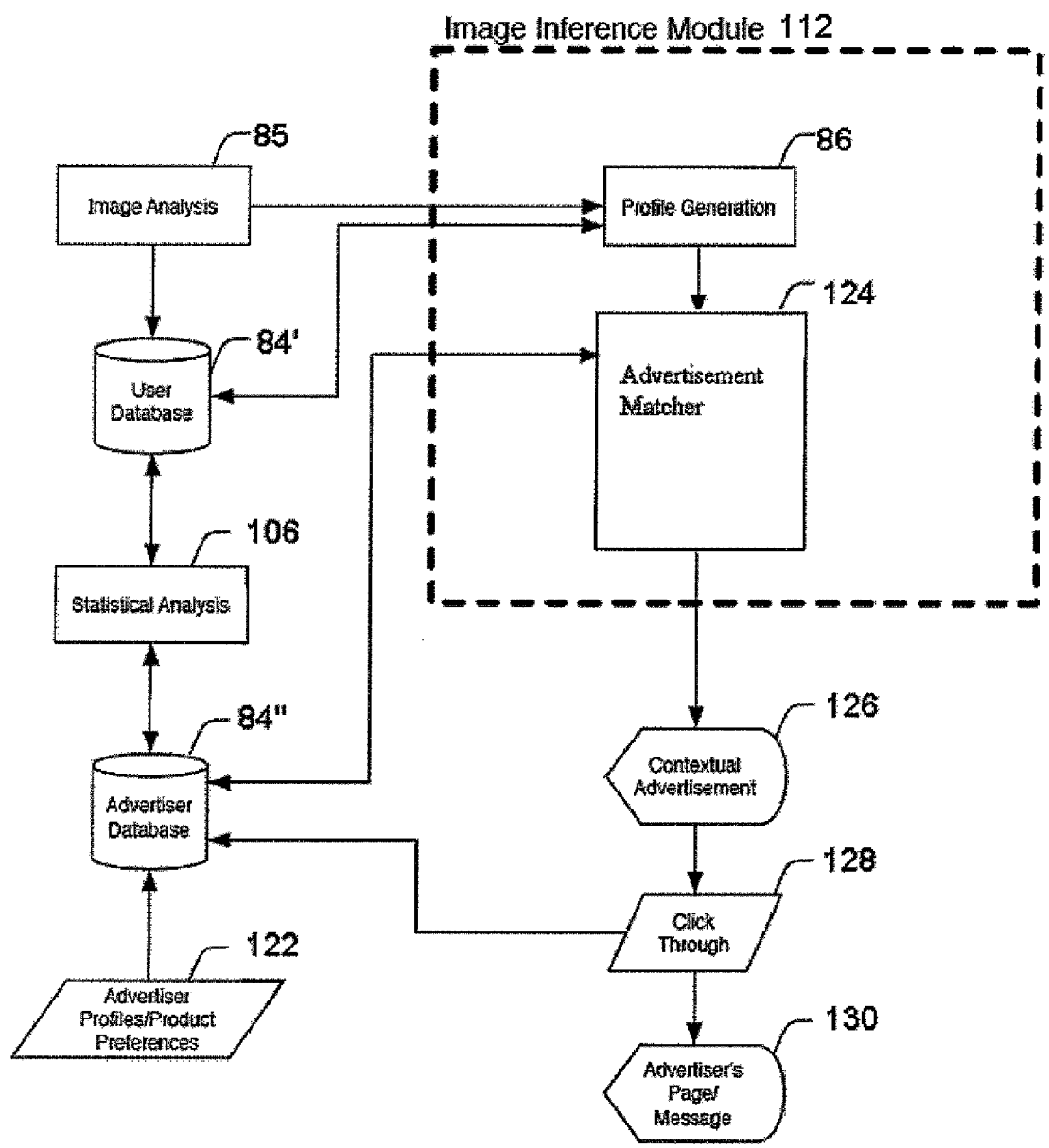
FIG. 7 illustrates the Image Inference Module of FIG. 5 along with its interaction with components of the system.

FIGS. 5 to 7 demonstrate a possible implementation of the method and system as illustrated in FIGS. 1 to 4. It is understood that alternative embodiments are possible.

In FIG. 5, the images 100 are uploaded 102 on the communication network 82 (refer to FIG. 4) so they may be shared with others via a multitude of digital communication channels. Once uploaded, the images 100 are sent to image analyzer and feature identifier 85. As described above, the features are identified, located, optionally extracted, classified and associate to qualifiers. The results of the image analysis are stored to a user database 84'.

A user logs connects (login 104) to the communication network 82. The user is identified and given access to an area where images are accessible. The user login is optionally performed separately from the uploading 102 of the images 100.

During user login, user information is optionally accessed using cookies, stored user data, or user communication access information. All login and ancillary information is stored in a memory device 84. The login process is optionally made automatic, anonymous and temporary. Once the user is logged, he/she can access the user database 84'.

Referring to FIG. 6, the Image Modification Module 88 takes information from the image analysis module 85 similar to the previously introduced image analyzer and feature identifier 85, the user database 84', the advertiser database 84" and statistical information 106, and from user-entered preferences and selections 108 (directly entered or stored in database 84'). All the images (modified or not) are stored in the user database 84', so that the user accesses them.

The Image Modification Module 88 uses the metatags generated by the image analysis module 85 to modify the image. User information from both user database 84' and from user preferences 108 is optionally used. The Image Modification Module 88 also accesses the Advertiser Database 84", to access trends, styles, potential revenue from advertiser associated with combinations of consumer profiles and templates to modify results and bias rankings.

An Appearance Template Generator 110 uses the metatags generated by 85, image modification techniques and graphics, artistic creation of an avatar, the beauty industry and the psychophysics of appearance and emotion to generate an array of modified versions of the original image. Appearance Template Generator 110 thus generates an array of image templates.

Referring to FIG. 7, the user database 84' optionally includes data generated by the profile builder 86 in the image inference module 112. Hence, the appearance template generator 110 accesses, via database 84', results from the profile builder 86, in order to determine the templates that will be accessed (template choices and queries 114). For example, the age, ethnicity, gender, emotion, style, fashion of person/people in the image or video is used to choose matching and appropriate templates. This ensures that the people in the image and the templates applied are compatible.

The user may have the option to modify the chosen templates through user-entered preferences 108 and user selections 116. For example, if the user selects to modify the attractiveness of a male in the image the underlying template for male attractiveness would be used, as opposed to a template for female attractiveness.

A given user selection 116 can be composed of zero, one or many template choices, and include any selection criteria such as, geographic information, lifestyle, and fashion or beauty choices. Such selection 116 is used to rank the modified images accordingly.

The images 100 are transformed in 118, by taking the original image(s) and transforming them using the ranked array of appearance templates. The image transformation is performed, for example, by a morphing operation anchored by corresponding facial features, e.g. eyes, nose, mouth, etc., between the image and the features registered on the selected template.

Alternatively, a transformation is applied to the individual facial features. For example, to enforce symmetry or ideal proportions of attractiveness or rearrangement and transformation of individual features to evoke emotions or other psychophysical concepts.

The result of the image transformation 118 is an array of modified images 120 to be displayed. This display occurs on a computer screen, an internet site or a mobile device/telephone. Once displayed the user has the ability to further modify the image either by selecting other templates or by selecting different preferences to bias the selection or ranking of templates.

The images displayed 120 and modification information are stored in the user database 84', along with all information the user entered at 108, 116.

Referring back to FIG. 5, the image inference module 112 uses information from 84', information obtained in 116, advertiser specific information from 122, and metatags resulting from the image analysis in 85.

In the profile builder 86, the image metatags from 85 are compared to any user information from 84', to generate a matrix of profile indicators. The profile is thus inferred by characteristics about the features found in the image that reflect gender, age, ethnicity, emotional state etc.

The profile and metatags are compared in the advertisement matcher 124, with advertising data such as user information niches, markets, products found in 84". This would generate correspondences between the figures in the image, user data and a set of targeted advertisements. An array of advertisements is thus generated, ranked by various criteria such as a match with the user data and user preferences 108, a match with the metatags obtained by the image analysis 85, a match with user selection 116, and a match with a consumer profile found in 84'. A selection of advertisements is generated and selected for display in 126. The contextual advertisement 126 thus depends on the consumer profile, the image content and user selections.

Note that the modified images 120 and the contextual advertisements 126 are optionally displayed simultaneously. Information on the matching advertisements, from 124, and whether the user selected an advertisement by clicking or any other form in 128, is optionally stored in 84".

If the user selects an advertisement in 128, this information is optionally relayed to the advertiser who may use it to display more information or send a message to the user (130).

Referring to FIG. 5, data from the users, image profiles, images displayed and user selection is stored in 84'. Similarly, data from user selections, advertisements displayed and advertisements selected is stored in 84". These two databases communicate with each other via a statistical analysis module 106, to collect data on current subject profiles generated in 86, transformed consumer profiles from 88, template selections 116, and advertisements 126. This data collection is performed to optimize the user experience and advertisement revenue. The statistical analysis 106 updates the 84' and 84" accordingly.

Alternatively, without the statistical analysis 106, such statistical information is provided to the advertiser directly, and thus forms part of 84". Statistical analysis 106 is optionally be used to analyze and identify styles, usage, characteristics and trends among users. This information is optionally compared with the advertiser database 84". Statistical analysis 106 is also optionally used to classify user by consumer profiles and to connect users together in a social networking or matchmaking experience.

The database 84" is also updated with information from 122 as the sets of available advertisements, products and advertisers change.

Figure 8:
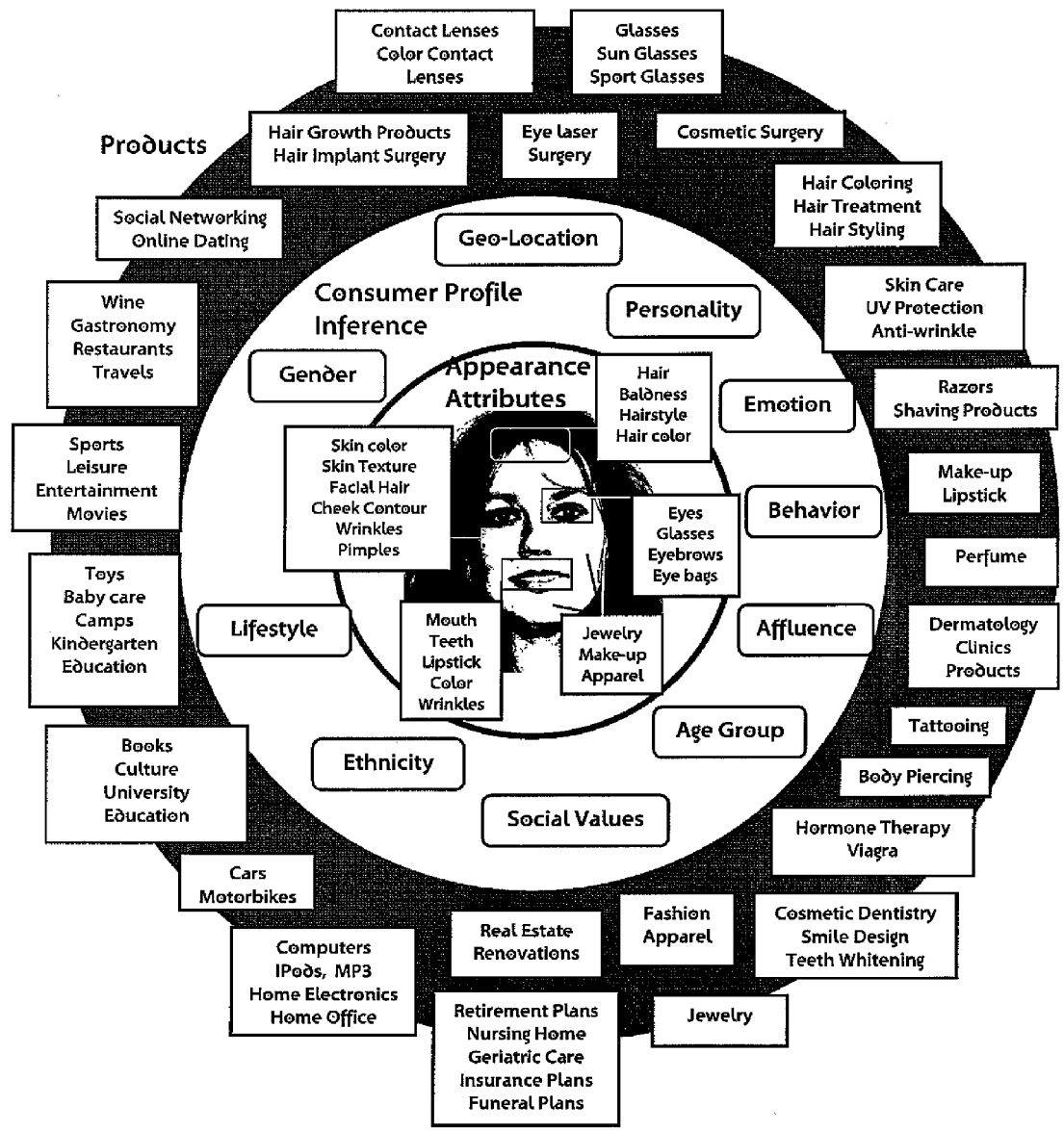
FIG. 8 presents examples of metatags which can be generated from the analysis of an image, as well as consumer metatags used to create consumer profiles and matching targeted advertisements.

Lastly, and referring to FIG. 8, the above described method and system are employed in a process further exemplified by the detection of several image features to generate metatags indicative of attributes of a person seen in an image, such as facial appearances, conveyed emotions, age group, etc., from which a consumer profile is created. The metatags and, optionally the associated consumer profile, are used to propose several types of products or services to the user through matched targeted advertisements.

In FIG. 8, for example, metatags indicating a skin color and texture, an ethnicity and an age group are used to further propose products or services such as cosmetic surgery, skin care or cosmetics.

The mouth feature on the image is classified in the categories lips, teeth or lipstick. Similarly for a feature representing a skin, hair, nose or eyes. The qualifying term associated to the category lips for example, can be a lip color or a texture. The resulting metatag can then be red lips, thin lips, chapped lips, a lipstick kind, female, 20 to 30 years old, or any other descriptive term.

Profile indicators are then matched with the metatags by cross-referencing with physiological statistical and advertiser information stored in a database. Profile indicators are thus taken from the list of generated metatags and vary from emotion, social values, gender, age group or any other attribute which may further describe a trait of the person in the image.

Targeted advertisements matching either one of the metatags and the profile of the user vary extensively depending on available advertisements. For example, if wrinkles are detected, and the facial features detected are indicative of a female user, cosmetics and skin care products may be advertised.

The examples illustrated in FIG. 8 are not limitative in any way and simply attempts to provide possible outcomes of the method. It is understood that other types of features, categories, qualifiers, and corresponding metatags, profiles and advertisements exist.

The embodiments of the invention described above are intended to be exemplary only. The scope of the invention is therefore intended to be limited solely by the scope of the appended claims.

What is claimed is:

1. A method for generating metatags indicative of an attribute of a person represented in an image, said method comprising:
performing a computer-based analysis of the image;
identifying individual facial features of the person in the image using facial feature detection analysis to determine structural characteristics of individual facial features, said identifying including estimating a position of individual facial features;
applying objective visual appearance metrics to at least one of the individual facial features to determine a qualifier indicating a specific characteristic of the at least one of the individual facial features;
associating the qualifier to the at least one of the individual facial features;
generating the metatags based on the associated qualifier;
creating a consumer profile using the metatags, wherein the creating a consumer profile comprises:
retrieving pre-set profile indicators;
matching the metatags with the pre-set profile indicators;
creating the consumer profile using the pre-set profile indicators which match the metatags; and
retrieving advertising data, comparing the consumer profile with the advertising data to generated correspondences with advertisements thereby generating targeted advertisement using the consumer profile, and outputting the targeted advertisement to a user interface for display;
wherein the metatags comprise at least one of: an eye color, a shape of eye, a shape of nose, a shape of face, a hair color, baldness, a hair style, hair quality, a type of glasses, a make-up color, a make-up application, a make-up characteristic, an eyebrow color, an eyebrow shape, an eye bag, facial hair, wrinkles, blemishes, a lipstick color, a mouth shape, a lip shape, a lip color, pimples, a skin color, a skin tone, a skin texture, a cheekbone contour shape, a teeth shape, a teeth condition, smile characteristics, an eye-shadow type, an eye-shadow color and a level of tan.

2. The method as in claim 1, further comprising at least one of outputting the metatags on a communication network and displaying the metatags on the user-interface of a user.

3. The method as in claim 1, wherein said individual facial features comprises one of: hair, eye, nose, ear, eyebrows, eye glasses, skin, cheekbone contour, mouth, lip, teeth, makeup, jewelry and facial hair.

4. The method as in claim 1, wherein the image comprises at least one of a still image and a video image.

5. The method as in claim 1, wherein the step of identifying comprises at least one of: using a specific feature detector; using appearance-based information; and using statistical training and statistical models.

6. The method as in claim 1, further comprising modifying the image to generate modified images using at least one of: the metatags, the consumer profile and a user input.

7. The method as in claim 6, wherein the step of modifying the image comprises at least one of: applying a template, applying an avatar, and morphing.

8. The method as in claim 7, further comprising ranking the modified images in an order determined by at least one of: the consumer profile and the user input.

9. The method as in claim 1, wherein said identifying further comprises:
associating the metatags to the image, the metatags being thereby related to the attribute of the person.

10. The method as in claim 1, further comprising classifying the at least at least one of the individual facial features in a category, said category being one of: eye, nose, mouth, ear, hair, glasses, and jewelry.

11. The method as in claim 1, wherein the qualifier comprises at least one of: a tone, an evenness, a color, a shape, an aspect, a type.

12. A system for generating metatags indicative of an attribute of a person represented in an image, said system comprising:
an image analysis device for performing a computer-based analysis of the image;
a feature identifier for identifying individual facial features of the person in the image using structural characteristics of individual features, said identifying including estimating a position of individual features;
a qualification module for applying objective visual appearance metrics to at least one of the individual facial features to determine a qualifier indicating a specific characteristic of the at least one of the individual facial features and associating a qualifier to the at least one of the individual facial features, a metatag generator for generating the metatags based on the associated qualifier;

a metatag matcher for associating the metatags to the image, the metatags being thereby related to the attribute of the person;

an image inference module for creating a consumer profile using the metatags, wherein the creating a consumer profile comprises:

retrieving pre-set profile indicators;

matching the metatags with the pre-set profile indicators;

creating the consumer profile using the pre-set profile indicators which match the metatags; and an advertisement matcher for matching targeted advertisement to the matched metatags;

wherein the metatags comprise at least one of: an eye color, a shape of eye, a shape of nose, a shape of face, a hair color, baldness, a hair style, hair quality, a type of glasses, a make-up color, a make-up application, a make-up characteristic, an eyebrow color, an eyebrow shape, an eye bag, facial hair, wrinkles, blemishes, a lipstick color, a mouth shape, a lip shape, a lip color, pimples, a skin color, a skin tone, a skin texture, a cheekbone contour shape, a teeth shape, a teeth condition, smile characteristics, an eye-shadow type, an eye-shadow color and a level of tan.

13. The system as in claim 12, further comprising an output device for outputting the associated metatags on a communication network.

14. The system as in claim 12, wherein the at least one of the individual facial features is one of: hair, eye, nose, ear, eyebrows, eye glasses, skin, cheekbone contour, mouth, lip, teeth, jewelry and facial hair.

15. The system as in claim 12, wherein the image comprises at least one of a still image and a video image.

16. The system as in claim 12, further comprising a display unit for displaying the matched targeted advertisement to a user.

17. The system as in claim 12, wherein the feature identifier further comprises a feature identifier for identifying the at least one of the individual facial features in the image using at least one of: known structural and appearance information about the at least one of the individual facial features, statistical training and pre-established statistical models of the at least one of the individual facial features.

18. The system as in claim 12, further comprising a profile generator for creating a consumer profile using the metatags.

19. The system as in claim 18, further comprising an image modification module for modifying the image according to at least one of: the metatags, the consumer profile and a user input.

20. The system as in claim 19, further comprising an advertising matcher in communication with the metatag matcher for matching targeted advertisement to the image by comparing the consumer profile and the metatags with advertising and statistical data, the targeted advertisement being based on the user input.

21. A method for generating metatags indicative of an attribute of a person represented in an image, said method comprising:

sending the image to a processing device over a communication network;

performing a computer-based analysis of the image;

identifying individual facial features of the person in the image using structural characteristics of each individual facial features, said identifying including estimating a position of each individual facial features;

applying objective visual appearance metrics to at least one of the individual facial features to determine a qualifier indicating a specific characteristic of the at least one of the individual facial features;

associating the qualifier to the at least one of the individual facial features, generating the metatags based on the associated qualifier;

associating the metatags to the image, the metatags being thereby related to the attribute of the person, storing the metatags associated to the image in a database, the database being accessible over the communication network;

modifying the image comprising:

retrieving at least one of the metatags, the consumer profile and a user input;

retrieving appearance templates;

matching any one of the metatags, the consumer profile and a user input with the appearance templates;

generate a modified image using the matched appearance templates; and accessing the database to retrieve the metatags and using the metatags to perform displaying the metatags on a display unit of a user, using the metatags to create a consumer profile, using the metatags to modify the image, and matching the metatags to a set of advertisements for display to the user;

wherein the metatags comprise at least one of: an eye color, a shape of eye, a shape of nose, a shape of face, a hair color, baldness, a hair style, hair quality, a type of glasses, a make-up color, a make-up application, a make-up characteristic, an eyebrow color, an eyebrow shape, an eye bag, facial hair, wrinkles, blemishes, a lipstick color, a mouth shape, a lip shape, a lip color, pimples, a skin color, a skin tone, a skin texture, a cheekbone contour shape, a teeth shape, a teeth condition, smile characteristics, an eye-shadow type, an eye-shadow color and a level of tan.

22. The method of claim 1, wherein the pre-set profile indicators include at least one of: age group, ethnicity, gender, emotional expression, lifestyle, affluence, social values, geo-location, personality, behavior and social group.

* * * * *